(No Model.)  2 Sheets—Sheet 1.

F. KLEEMANN.
EVAPORATING PAN.

No. 572,304. Patented Dec. 1, 1896.

Attest
Malcolm Donaldson
James M. Shea

Inventor
Fritz Kleemann
by Richards & Co
Attys.

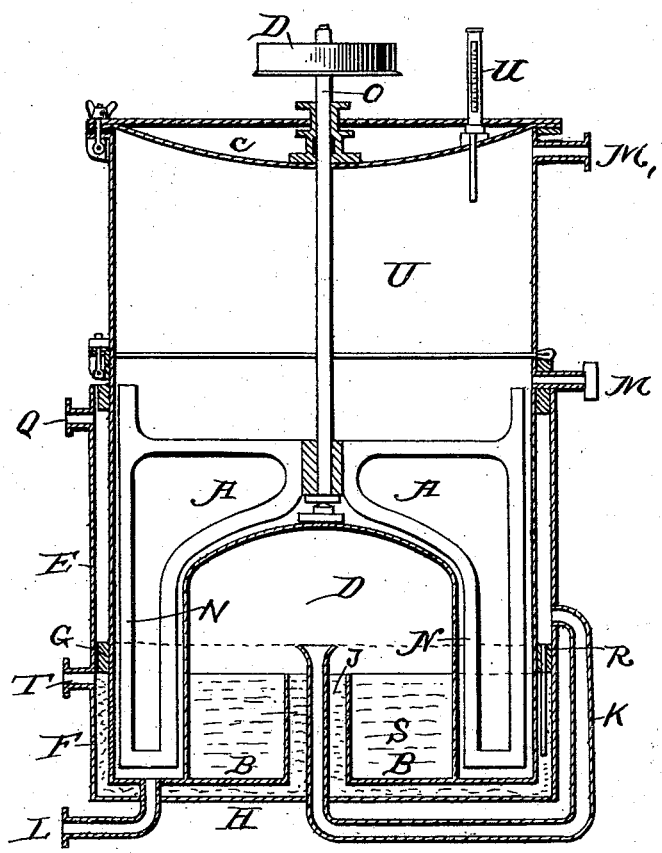

UNITED STATES PATENT OFFICE.

FRITZ KLEEMANN, OF BERLIN, GERMANY.

EVAPORATING-PAN.

SPECIFICATION forming part of Letters Patent No. 572,304, dated December 1, 1896.

Application filed March 1, 1894. Serial No. 501,996. (No model.)

*To all whom it may concern:*

Be it known that I, FRITZ KLEEMANN, a subject of the German Emperor, residing at the city of Berlin, in the Kingdom of Prussia, Germany, have invented certain new and useful Improvements in Apparatus for Heating and Evaporating Liquids, of which the following is a specification.

The heating or evaporating of juices or liquids, especially those which contain mucilaginous or gummy substances or which precipitate such substances during the heating process, as albumen, &c., or wherein such substances are formed, is a difficult matter, because said substances settle upon the heating-surfaces and render the same useless or burn upon the same, or because they are decomposed, so that they injure the quality of the liquid either by changing its color, its taste, or its composition. The subject-matter of the present application remedies all these defects in that the heating occurs first by means of the hot water, then by means of steam, while the liquid itself is kept in constant motion by a stirring apparatus.

The apparatus used for that purpose is illustrated by the annexed drawings, of which—

Figure 1:
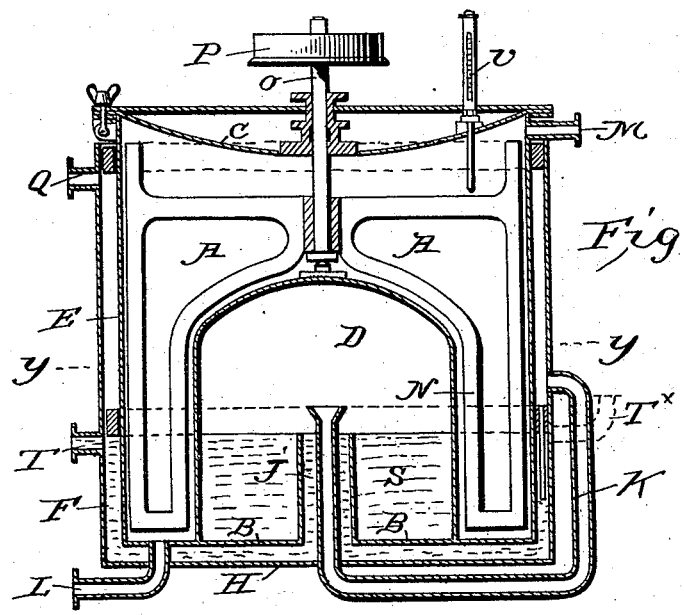
Figure 2:
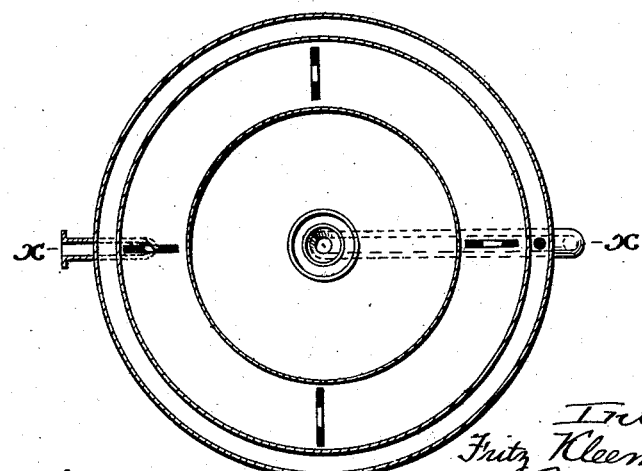

Figure 1 shows a sectional elevation on the line $x\ x$ of Fig. 2; Fig. 2, a horizontal section on the line $y\ y$ of Fig. 1; Fig. 3, a sectional elevation of a modification on line $xx$ of Fig. 2.

My invention is used for treating fruit and sugar juices, marmalades, and milk.

For the purpose of receiving the liquid to be heated the said apparatus consists of a cylindrical vessel A, provided with a rigid bottom B and closed by means of a removable cover C.

A cap or bell D, with a spherical or conical cover, is so arranged in said vessel A that it is closely united with the bottom B, and a stirring apparatus is introduced in such a manner that its arms N N do not touch the walls of the vessel A nor those of the cap D. The said stirring apparatus is actuated by the shaft O and the pulley P or by some other mechanism.

The cylindrical part of the vessel A is surrounded by a heating-jacket, which is divided in two parts E and F by a partition G, and the bottom B is also provided with a double heating-jacket H, which forms a common heating-chamber with the lower part F of the heating-jacket of the cylindrical part of the vessel A.

In the center of the bottom B there is an opening with an open cylindrical head-piece J, the top edge of which is level with the height of the partition G, and the heating-jacket E is connected with the interior of the cap D by the pipe K.

The liquid to be heated is introduced continuously into vessel A through the tube L at the bottom B, rises in the same whole in a constant motion caused by the stirring apparatus N, and flows out through the tube M.

For heating, steam is let into the heating-jacket E through the tube Q, which, after having circulated through the tube K, reaches into the interior of the cap D, while the condensed water that was formed in the heating-jacket E flows into the double bottom H through the opening R in the partition G.

The condensed water generated in the cap D gathers into the chamber S, formed by the latter and by the head-piece J, and after having filled the same it flows off through said head-piece J into the double bottom H, out of which it flows through the tube T, located at the highest point of the heating-jacket F.

In order to make the apparatus work successfully, it will be desirable to fill the water-heating chambers F, S, and H with hot or warm water. According to the composition of the liquid to be heated and according to the desired degree of heat it will be necessary to introduce some hot or warm water other than the condensed water of the apparatus into the water-heating chambers F, S, and H through a tube located opposite the exit-tube T, as shown at $T^\times$ in dotted lines. By this arrangement the double bottom H, as well as the lower part of the cap D and the heating-jacket F, is filled with the hot or warm water, and therefore the liquid to be heated that is introduced into the bottom B through the tube L is first made warm by the same before being heated further by the steam in the heating-jacket E and in the upper part of the cap D.

It is obvious that the maximum temperature will be found at a certain elevation over the cap D, which will correspond to the afflux of steam and is shown by the thermometer V, and that the duration for which the liquid to be heated will have to be exposed to that maximum temperature will depend upon the size of the room of the vessel A over that point of maximum temperature. The duration varies for different liquids and for the different purposes for which the same have to be used.

In order to increase the height of the apparatus, I may use an extension-ring U, as shown in Fig. 3, above the vessel A, said extension having an outlet-pipe M'. When this form of apparatus is used, the heated material may flow off through the pipe M, while steam or gas freed therefrom may pass off through the tube M'.

What I claim is—

1. In combination, the casing A, the interior cap D, the steam heating-jacket E, the double bottom H and chamber F, the pipe J extending up from the double bottom and opening into the cap D, the supply-pipe leading to the interior of the casing for the liquid to be treated, the water supply adapted to fill the chamber F the double bottom H and the cap D up to the level of the tube J, the steam-supply-pipe leading to the jacket E and to the interior of the cap D the outlet for the condensed steam from the jacket E and the stirrer within the casing A, substantially as described.

2. In combination, the casing A, the cap D therein, the water-chamber around the lower part of the casing A and at the bottom of the interior cap D, the steam supply leading to the upper part of the casing and the upper part of the cap, the supply-conduit for the liquid at the lower part of the chamber A and the discharge leading from the upper part thereof whereby the rising liquid to be treated is subjected first to the action of the hot water and then to the action of the steam, substantially as described.

In witness whereof I have hereunto set my hand in presence of two witnesses.

FRITZ KLEEMANN

Witnesses:
  W. HAUPT,
  G. WILLNOR.